(12) United States Patent
Edwards et al.

(10) Patent No.: US 7,961,091 B2
(45) Date of Patent: Jun. 14, 2011

(54) METHOD FOR SYNCHRONIZING FREQUENCY-HOPPING SHORT-RANGE RADIO DEVICES

(75) Inventors: Lewin A. Edwards, Forest Hills, NY (US); Stanley W. Albrechtsen, Centereach, NY (US); Theodore A. White, Norwalk, CT (US)

(73) Assignee: Honeywell International Inc., Morristown, NJ (US)

( * ) Notice: Subject to any disclaimer, the term of this patent is extended or adjusted under 35 U.S.C. 154(b) by 488 days.

(21) Appl. No.: 11/967,678

(22) Filed: Dec. 31, 2007

(65) Prior Publication Data
US 2009/0167521 A1   Jul. 2, 2009

(51) Int. Cl.
*G08B 1/08* (2006.01)
*H04B 1/38* (2006.01)
*H04L 7/00* (2006.01)

(52) U.S. Cl. ............... 340/539.1; 340/539.11; 375/371; 375/222

(58) Field of Classification Search ............... 340/539.1, 340/539.11; 375/371, 222
See application file for complete search history.

(56) References Cited

U.S. PATENT DOCUMENTS

| | | | | |
|---|---|---|---|---|
| 4,023,103 A * | 5/1977 | Malm | .......................... | 455/62 |
| 4,554,668 A * | 11/1985 | Deman et al. | ................. | 375/133 |
| 4,998,290 A * | 3/1991 | Olenick et al. | ................ | 455/509 |
| 5,394,433 A * | 2/1995 | Bantz et al. | .................... | 375/132 |
| 5,430,775 A * | 7/1995 | Fulghum et al. | ............. | 375/134 |
| 6,061,389 A * | 5/2000 | Ishifuji et al. | ................. | 375/133 |
| 7,027,773 B1 * | 4/2006 | McMillin | ..................... | 455/41.2 |
| 7,450,627 B2 * | 11/2008 | Couch et al. | .................. | 375/132 |
| 2003/0137403 A1 * | 7/2003 | Carrender et al. | .......... | 340/10.4 |

* cited by examiner

*Primary Examiner* — George A Bugg
*Assistant Examiner* — Jack Wang
(74) *Attorney, Agent, or Firm* — Husch Blackwell

(57) ABSTRACT

A method for synchronizing a security system control panel and a sensor. The control panel and the sensor each have a transceiver. The control panel monitors a publicly broadcast signal for an time signal, periodically receives the time signal, calculates a frequency hopping index pointer using the time signal and accesses a frequency hopping table using the frequency hopping index pointer. The frequency hopping table is used by the control panel to determine when to hop between multiple receiving channels and which of the receiving channels to hop. The sensor wakes up from a standby mode when the sensor determines that the sensor is to send data, receives the publicly broadcast signal that includes a time signal, selects the channel that the control panel is actively receiving data using the time signal and transmits the data to the control panel using the selected channel.

9 Claims, 3 Drawing Sheets

METHOD FOR SYNCHRONIZING FREQUENCY-HOPPING SHORT-RANGE RADIO DEVICES

FIELD OF THE INVENTION

The present invention is related to radio communication devices, security systems and sensors. More particularly, the present invention relates to a method for synchronizing remotely located radio devices where the radio devices are spread spectrum devices.

BACKGROUND

Security systems are used to protect life and property. A typical security system includes a control panel and multiple sensors. The control panel includes a transceiver for transmitting and receiving data from the sensors. The sensors include a transceiver for transmitting and receiving data from the control panel. The transceivers are adapted for spread spectrum (frequency hopping communication). These transceivers operate on a fixed set of channels.

A pseudorandom channel-hopping order is designed into a communication protocol so that all the radio traffic is spread evenly across all of the defined channels within the system. The list of channels and the hopping sequence in which they are used, are specified in a product's design and form part of the type approval requirements for the device.

The sensors also include a battery. The sensors are typically asleep in a standby mode for most of the time to save battery power. The sensors wake up infrequently to send supervisory or alarm messages. In general, it is either cost- or power-prohibitive for the sensor to maintain an internal timebase with sufficient accuracy that it can remain in synchronization with the control panel during sleep mode. Therefore, at each wakeup, the sensor must go through a negotiation phase to synchronize its position in the pseudorandom hop sequence with the transceiver in the control panel. This negotiation phase takes a considerable time, which impacts battery life of the sensor.

Currently, the control panel transmits a beacon containing a time reference to the sensor for synchronization. The sensors use the time reference to synchronize the channel with the control panel. However, FCC regulations limit the transmissions of the beacon in such a way that a potentially lengthy negotiation sequence is necessary for the control panel and the peripheral to be sure they are synchronized correctly.

SUMMARY OF THE INVENTION

Accordingly, disclosed is a system and method for using an external, publicly accessible broadcast time signal to maintain synchronization between a transceiver in a sensor and a transceiver in a control panel.

The method comprises the steps of monitoring a publicly broadcast signal for a time signal by the security system control panel, periodically receiving the time signal at the security system control panel, calculating a frequency hopping index pointer by the security system control panel using the time signal and accessing a frequency hopping table using the frequency hopping index pointer. The frequency hopping table is used by the security system control panel to determine when to hop between a plurality of different receiving channels and which of the plurality of different receiving channels to hop.

The method further comprises the steps of waking up from a standby mode when a sensor determines that the sensor is to send data, receiving the publicly broadcast signal that includes a time signal by the sensor, selecting which of the plurality of different receiving channels that the security system control panel is actively receiving data using the time signal and transmitting the data to the security system control panel using the selected channel.

The method further comprises the steps of determining if another sensor is transmitting or receiving data on the selected channel and transmitting the data to the security system control panel when the result of the determining is that the selected channel does not have any data being actively transmitted.

Either using the least significant bits of the time signal or a hash of all of the bits of the time signal can calculate the frequency hopping index pointer. The same method is used at the sensor and the security system control panel.

The calculating step comprises the substeps of extracting a preset number of least-significant bits from the time signal and generating the frequency hopping index pointer from the preset number of least-significant bits. At the sensors, the selecting step comprises the substeps of extracting a preset number of least-significant bits from the time signal and selecting one of the plurality of receiving channels for the security system control panel according to the preset number of least-significant bits.

Alternatively, the calculating step comprises the substeps of hashing bits from the time signal to a predetermined bit stream and generating the frequency hopping index pointer from the predetermined bit stream. At the sensors, the selecting step comprises the substeps of hashing bits from the time signal to a predetermined bit stream and selecting one of the plurality of receiving channels for the security system control panel according to the predetermined bit stream.

The publicly broadcast signal can be any public signal that periodically broadcasts a time signal or a timestamp such as a GPS signal or other radionavigation signal or a cellular telephone control signal.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

The present invention includes a method and system for synchronizing transmitting and receiving channels for a sensor and a control panel in a security system.

Figure 1:
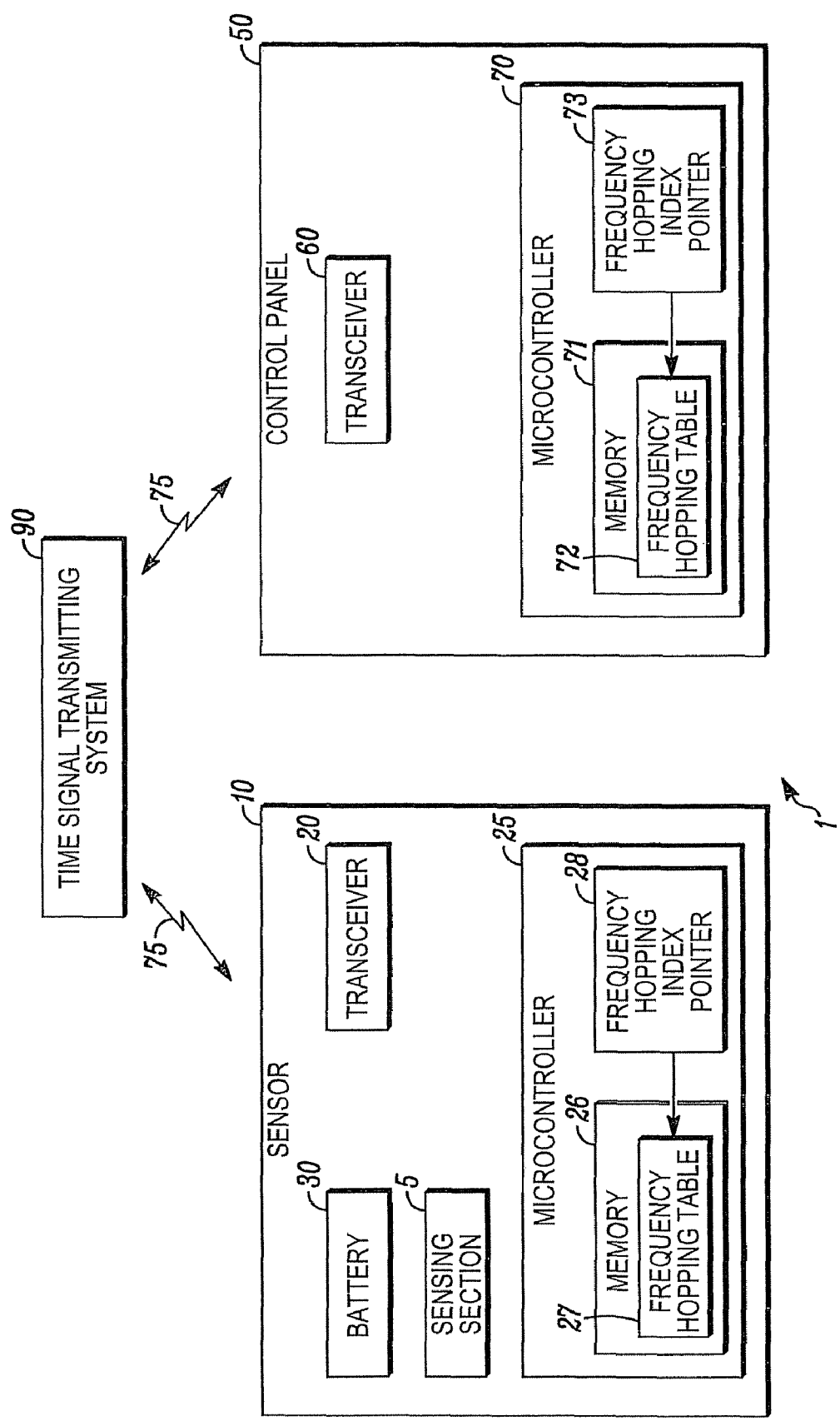
FIG. 1 is a block diagram of a synchronizing system in accordance with an embodiment of the invention.

FIG. 1 illustrates a block diagram of the synchronizing system 1. The synchronizing system comprises a sensor 10, a control panel 50 and a time signal transmitting system 90. The sensor 10 and control panel 50 includes a transceiver (20 and 60), respectively. The transceivers (20 and 60) are spread-spectrum transceiver capable of transmitting and receiving on a fixed set of channels. For example, the transceivers (20 and 60) can transmit and receive over 64 channels, i.e., 64 different frequencies. The transceivers (20 and 60) operate either at a 900 Mhz or 2.4 Ghz band. The precise frequency in use at any given moment is selected from a fixed table resident in the microcontroller memory at each end of the link (e.g., 26 and 71).

Transceiver 60 is adapted to frequency hop between different channels over time. U.S. regulations require that the frequency hopping be performed pseudorandomly. This frequency hopping poses a challenge for the sensor 10 to determine which channel that the control panel 50 is monitoring at the precise moment when the sensor 10 has data available to transmit. A sensor 10 must synchronize its position in the frequency hop with that of the control panel 50. According to the invention, a time signal 75 generated and transmitted by a time signal transmitting system 90 is used to synchronize the position in the frequency hop sequence.

The time signal transmitting system 90 can be a Global Position System (GPS), which broadcasts a time signal 75, adjusted to within 1 microsecond of UTC. The UPS frequency is 1.57542 Ghz. Specifically, the GPS data payload contains a timestamp continuously adjusted by a satellite control center. In an embodiment, transceivers (20 and 60) are tunable to this frequency. In another embodiment, a separate dedicated receiver is tuned to this frequency.

Additionally, the time signal transmitting system 90 can be other "public domain" systems such as a control signal from a cellular telephone network (IS-95, CDMA, GSM). Similarly, in an embodiment, the transceivers (20 and 60) would be tunable to the cellular telephone network or other "public domain" frequency.

The time signal 75 from the time signal transmitting system 90 is publicly available. Since the time signal 75 is publicly available FCC restrictions that restrict the ability of the control panel 50 to beacon a synchronization signal are obviated.

As depicted in FIG. 1, the sensor 10 includes a sensing section 5, a microcontroller 25 and a battery 30. The sensor 10 is typically in a standby mode in order to save the battery life. The power consumed by the sensor 10 in standby mode is significantly reduced. The microcontroller 25 is programmed with firmware to detect events, transmit reports to the control panel 50 and to select a channel for transmission in accordance with the invention. The microcontroller 25 includes a memory 26 that stores instructions for selecting the transmission channel and detection thresholds.

Similarly, the control panel 50 includes a microcontroller 70 that is programmed with firmware to process the reports from the sensor 10 and relay information to a monitoring station. Additionally, the microcontroller 70 is programmed to control the frequency hopping of the transceiver 60.

The sensors 10 are deployed with a protected premise. The control panel 50 is located within a building protected by the security alarm system, typically in a concealed location. The control panel 50 may include a local display of all pertinent parameters and conditions of the security alarm system, and may also provide inputs, such as a Graphical User Interface (GUI) (not shown), to allow a user to enter data into and access and control a security system.

Figure 2:
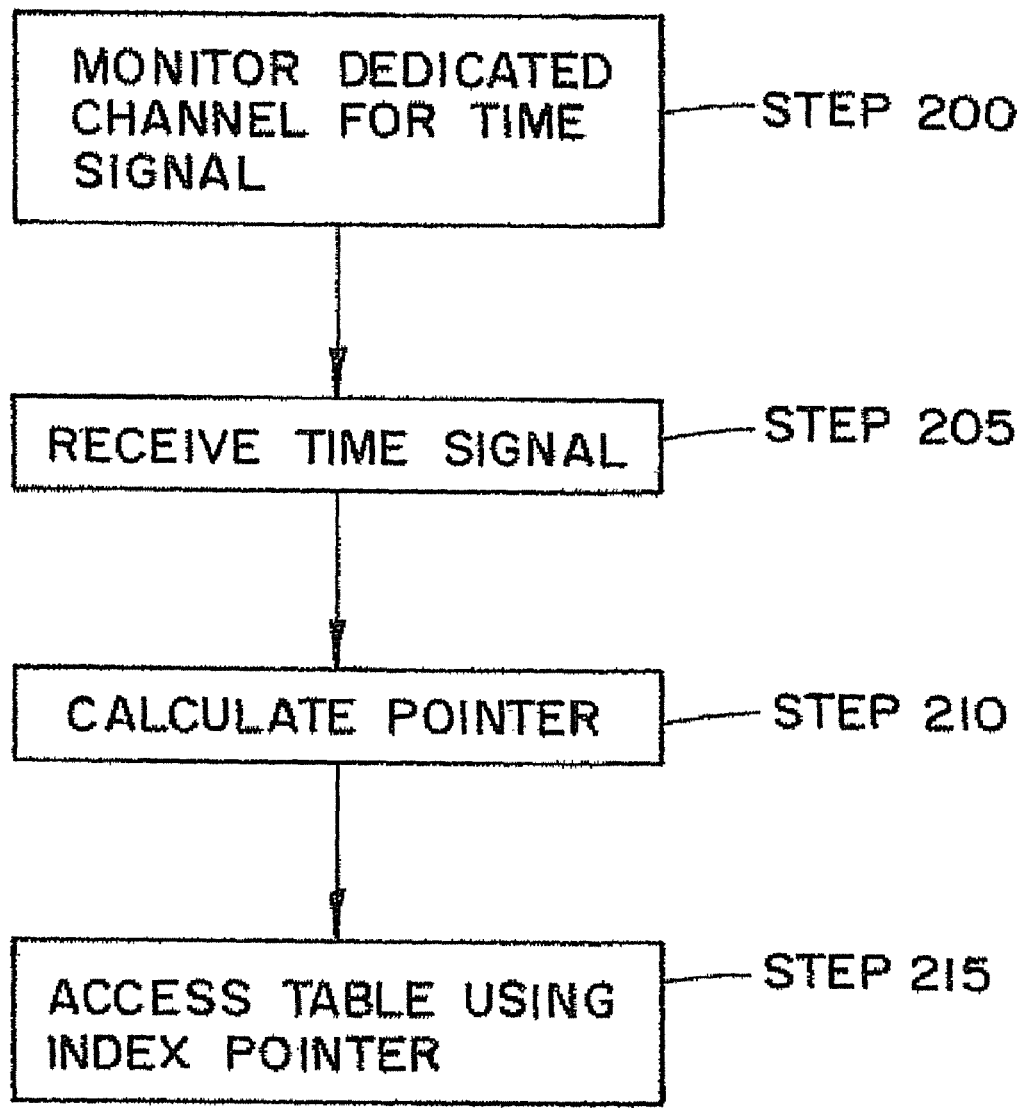
FIGS. 2-3 illustrate a flow chart of the synchronizing method according to an embodiment of the invention.
Figure 3:
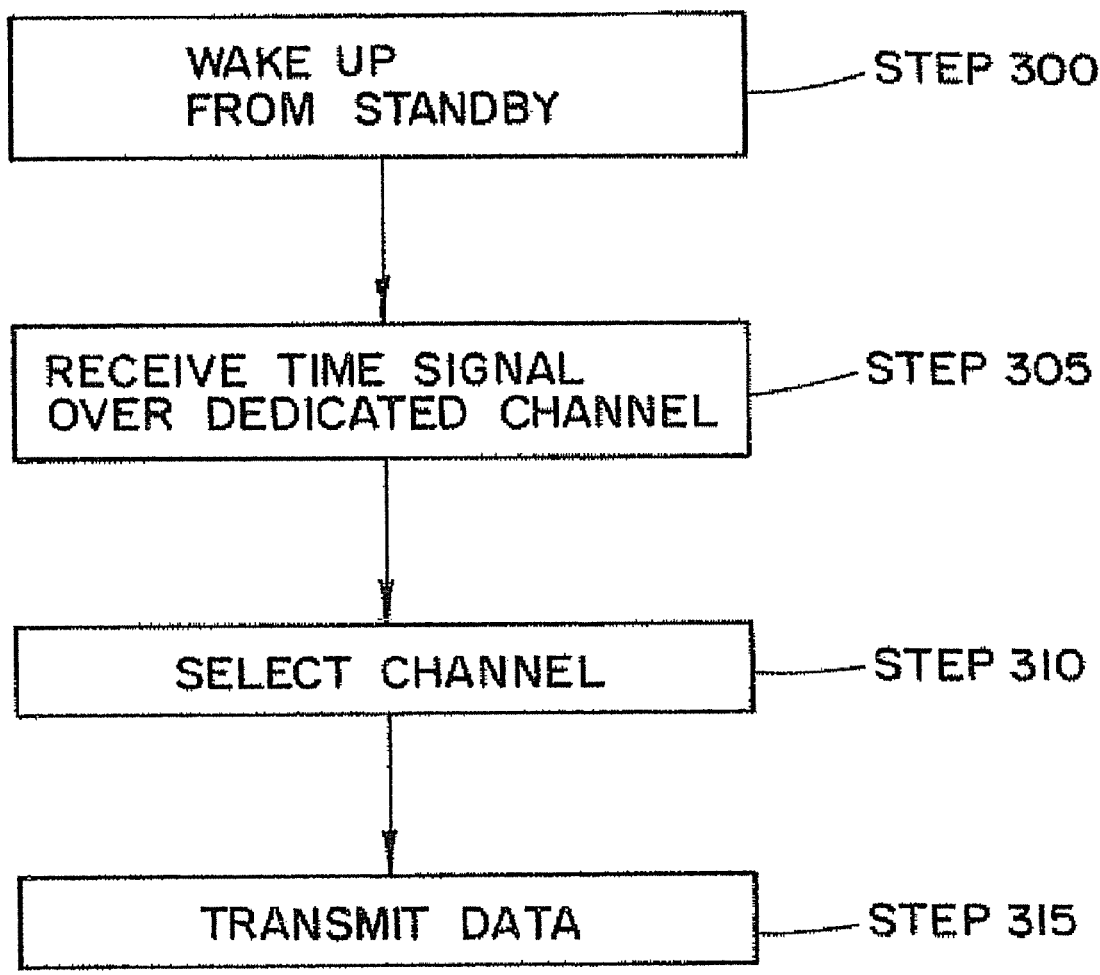

FIGS. 2 and 3 illustrate a flow chart of the synchronizing method according to an embodiment of the invention. FIG. 2 illustrates the method steps performed by the control panel 50 and FIG. 3 illustrates the method steps performed by the sensor 10.

In operation, the transceiver 60 samples the incoming time signal 75 and continuously corrects an internal timebase to match the time signal 75 at all times.

At step 200, the control panel 50 monitors a dedicated channel for the time signal 75. The dedicated channel is preset and determined based upon the type of time signal transmitting system 90. At step 205, the time signal 75 is received by the transceiver 60 and the microcontroller 70 extracts the time stamp from the time signal 75. The time stamp portion of the time signal 75 is an N bit binary number representing the current local time. For example, calculating the current time from a GPS timestamp involves additional corrections for ionospheric variations and other data provided from the satellite. However, since the method does not require synchronization to absolute real time, and since sensor 10 and control panel 50 are physically located in a sufficiently small radius, the time signal error can be assumed to be the same at both sensor 10 and control panel 50; hence it is not necessary to calculate and adjust for this error. Omitting this calculation significantly reduces the computational burden on both ends of the link.

At step 210, a frequency-hopping index pointer is calculated. The frequency-hopping index pointer is used to index each channel that the transceiver 60 is capable of receiving or transmitting data. The frequency-hopping index pointer is used to select a channel from a fixed, factory-programmed frequency-hopping table stored in memory 26 and 71. The table is identical in both control panel 50 and sensors 10, so that for a given value of the index pointer, both the control panel 50 and sensors 10 will look up the same frequency selection. In an embodiment, the frequency-hopping index pointer is calculated based upon the least significant bits of the time signal 75, e.g., time stamp. For example, if there are 64 channels in the hopping table, the frequency-hopping index pointer will use least significant 6-bits of the time signal 75.

In another embodiment, the frequency-hopping index pointer is calculated by hashing the entire time signal, e.g., time stamp. The hashing takes a larger number of bits of the time stamp and reduces it down to a preset bit size. For example, if there are 64 channels, the preset bit size is 6-bits. According to this embodiment, the spread channel usage is equally spread across all of the channels. The specific hash function is stored in memory 71 and performed by the microcontroller 70.

At step 215, the frequency-hopping table is accessed using the frequency-hopping index pointer as an index. Using the frequency-hopping table, the current frequency hop is unambiguously determined.

When the sensor 10 has data to send, the sensor 10 switches from standby mode to active mode, i.e., wakes up, at step 300. The microcontroller 25 determines that there is data for transmission. In another embodiment, the microcontroller 25 periodically wakes up. At step 305, the time signal 75 is acquired from the time signal transmitting system 90. The time signal 75 is received by the transceiver 20 using a dedicated channel, e.g., frequency 1.57542 GHz. The time signal 75 includes a time stamp with the current time. The sensor 10 uses the time stamp to select a channel that the control panel 50 is currently monitoring, i.e., current frequency hop, at step 310. The sensor is programmed with an identical frequency-hopping table as the control panel 50. The same frequency-hopping index pointer indexes the frequency-hopping table. Therefore, the sensor 10 can select the frequency hop by calculating the frequency-hopping index pointer using the same method as described in step 210, e.g., least significant bits or hashing. If the control panel 50 used hashing to calculate the frequency-hopping index pointer, the sensor 10 will use the same hashing function. The hashing function is stored in memory 26 of the microcontroller 25.

The predicted frequency hop (channel) is selected from the frequency-hopping table that is indexed by the calculated frequency-hopping index pointer. At step 315, the sensor transmits the data to the control panel 50, using the predicted frequency hop (channel). The microcontroller 25 causes the transceiver 20 to transmit the data using the predicted frequency hop (channel).

In an embodiment, prior to transmitting the data using the predicted hop (channel), the sensor 10 determines if the channel is being used by another device, e.g., another sensor. This determination uses a collision detection procedure. For example, the sensor 10 can calculate a received signal strength indicator (RSSI) for the predicted hop (channel) and compare the calculated RSSI with a threshold. Other known carrier sensing methods for the channel and time slot can be used to detect a collision. If the channel is available, the sensor 10 will transmit the data using the transceiver 20.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for synchronizing a security system control panel and a sensor, where the security system control panel and the sensor each have a transceiver, the method comprising the steps of:
   the security system control panel monitoring a publicly broadcast signal for a time signal generated and transmitted by a signal transmitting system;
   receiving periodically the time signal directly from the signal transmitting system at the security system control panel;
   calculating a frequency hopping index pointer by the security system control panel using the time signal;
   accessing a frequency hopping table using the frequency hopping index pointer, the frequency hopping table is used by the security system control panel to determine when to hop between a plurality of different receiving channels and which of the plurality of different receiving channels to hop; and
   the sensor receiving a time stamp directly from the signal transmitting system and selecting a channel of the plurality of different receiving channels that the security system control panel is then monitoring for signals from the sensor.

2. The method for synchronizing a security system control panel and a sensor according to claim 1, further comprising the steps of:
   waking up from a standby mode when a sensor determines that the sensor is to send data;
   receiving the publicly broadcast signal that includes a time signal by the sensor;
   selecting using the time signal which of the plurality of different receiving channels that the security system control panel is actively receiving data; and
   transmitting the data to the security system control panel using the selected channel.

3. The method for synchronizing a security system control panel and a sensor according to claim 1, wherein said publicly broadcast signal is a GPS or other radionavigation signal.

4. The method for synchronizing a security system control panel and a sensor according to claim 1, wherein said publicly broadcast signal is a cellular telephone control signal comprising a broadcast timestamp.

5. The method for synchronizing a security system control panel and a sensor according to claim 2, further comprising the steps of:
   determining if another sensor is transmitting or receiving data on the predicted channel; and
   transmitting the data to the security system control panel when the result of the determining is that the selected channel does not have any data being actively transmitted.

6. The method for synchronizing a security system control panel and a sensor according to claim 1, where the calculating step comprises the substeps of:
   extracting a preset number of least-significant bits from the time signal; and
   generating the frequency hopping index pointer from the preset number of least-significant bits.

7. The method for synchronizing a security system control panel and a sensor according to claim 2, where the selecting step comprises the substeps of:
   extracting a preset number of least-significant bits from the time signal; and
   selecting one of the plurality of receiving channels for the security system control panel according to the preset number of least-significant bits.

8. The method for synchronizing a security system control panel and a sensor according to claim 1, where the calculating step comprises the substeps of:
   hashing bits from the time signal to a predetermined bit stream; and
   generating the frequency hopping index pointer from the predetermined bit stream.

9. The method for synchronizing a security system control panel and a sensor according to claim 2, where the selecting step comprises the substeps of:
   hashing bits from the time signal to a predetermined bit stream; and
   selecting one of the plurality of receiving channels for the security system control panel according to the predetermined bit stream.

* * * * *